(12) United States Patent
Lu et al.

(10) Patent No.: US 7,806,977 B2
(45) Date of Patent: Oct. 5, 2010

(54) COMPOSITIONS AND METHODS COMPRISING TITANIUM DIOXIDE PIGMENTS AND COUPLING AGENTS

(75) Inventors: Gang Lu, Severna Park, MD (US); Linh Thuy Cheong, Columbia, MD (US); William W. Reichert, Ellicott City, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 11 days.

(21) Appl. No.: 10/977,581

(22) Filed: Oct. 29, 2004

(65) Prior Publication Data

US 2006/0090672 A1 May 4, 2006

(51) Int. Cl.
C09C 1/36 (2006.01)

(52) U.S. Cl. .................. 106/447; 106/436; 106/437

(58) Field of Classification Search .......... 106/417–491
See application file for complete search history.

(56) References Cited

U.S. PATENT DOCUMENTS

| | | | | |
|---|---|---|---|---|
| 4,328,041 A * | 5/1982 | Wilson | ........................ | 106/429 |
| 4,601,503 A * | 7/1986 | Wicks, Sr. | .............. | 292/259 R |
| 4,909,852 A * | 3/1990 | Atkinson | .................... | 106/448 |
| 4,943,506 A * | 7/1990 | Demizu et al. | ........... | 430/108.3 |
| 4,952,617 A * | 8/1990 | Ayala et al. | ................. | 523/200 |
| 5,252,658 A | 10/1993 | Dethlefs et al. | ............. | 524/492 |
| 5,501,732 A * | 3/1996 | Niedenzu et al. | ........... | 106/447 |
| 5,653,794 A | 8/1997 | Weber et al. | ................. | 106/442 |
| 5,889,090 A * | 3/1999 | Tooley et al. | ............... | 523/212 |
| 5,908,498 A * | 6/1999 | Kauffman et al. | .......... | 106/437 |
| 5,959,004 A * | 9/1999 | Tooley et al. | ............... | 523/212 |
| 6,146,767 A | 11/2000 | Schwartz | .................... | 428/457 |
| 6,214,106 B1 | 4/2001 | Weber et al. | ................. | 106/442 |
| 6,553,169 B2 * | 4/2003 | Fabian | ....................... | 385/128 |
| 6,620,234 B1 | 9/2003 | Kostelnik et al. | ........... | 106/445 |
| 6,645,644 B1 | 11/2003 | Schwartz et al. | ............ | 428/632 |
| 6,646,037 B1 | 11/2003 | El-Shoubary et al. | ...... | 524/413 |
| 6,765,041 B1 | 7/2004 | El-Shoubary et al. | ...... | 523/205 |
| 6,913,639 B2 | 7/2005 | Wang et al. | ............. | 106/31.27 |
| 2002/0069790 A1* | 6/2002 | Hayashi et al. | ............. | 106/482 |
| 2002/0086168 A1* | 7/2002 | Sadvary et al. | ............. | 428/447 |
| 2002/0151629 A1* | 10/2002 | Buffkin et al. | .............. | 524/284 |
| 2005/0014083 A1* | 1/2005 | Thaker | .................... | 430/110.1 |
| 2005/0228112 A1* | 10/2005 | Takahashi et al. | ........... | 524/497 |

FOREIGN PATENT DOCUMENTS

| | | |
|---|---|---|
| EP | 0 306 056 | 3/1989 |
| GB | 1515645 | 6/1978 |
| JP | 06-080798 | 3/1994 |

OTHER PUBLICATIONS

Hussain et al. "Effect of coupling agents on the mechanical properties improvement of the TiO2 reinforced epoxy system" Apr. 1996; Material letters 26(1996) 299-303.*
J. Miller et al., *J. Am. Chem. Soc.* 115 (1993) 8239.
S. Monte, *Polymers & Polymer Composites* 10 (2002) 1.
J. Schwartz et al., *Journal of Molecular Catalysis A: Chemical* 146 (1999) 45.
M. Aizawa et al., *Journal of Colloid and Interface Science* 139 (1990) 324.
G. Wang et al., *Journal of Applied Polymer Science* 85 (2002) 2485.
M. Fuji et al., *Studies in Surface Science and Catalysis* 132 (2001) 853.
M. Hussain et al., *Material Letters* 26 (1996) 299.
T. Murakata et al., *Journal of Chemical Engineering of Japan* 34 (2001) 1236.
R. Janssen et al., *Royal Society of Chemistry* 138 (1993) 102.
C. Caris et al., *FATIPEC—Kongr.* 20 (1990) 325.

* cited by examiner

*Primary Examiner*—Jerry Lorengo
*Assistant Examiner*—Shuangyi Abu Ali
(74) *Attorney, Agent, or Firm*—Dunlap Codding, P.C.

(57) ABSTRACT

Pigment compositions and methods are provided comprising coupling agents. In various embodiments, a pigment is provided comprising titanium dioxide and a coupling agent having the formula: $(R'O)_{(q-n)}M(XR_m)_n$ wherein M is Ti, Zr, Sn, or Al; X is $-CO_2$, $=PO_2$, $-PO_2(OH)$, $=PO_2PO_2(OH)$, or $-SO_3$; m is 1 or 2; n is 1, 2, or 3 and q is 4 when M is Ti, Zr or Sn, or n is 1 or 2 and q is 3 when M is Al; R' is a substituted or unsubstituted alkyl, alkynyl, alkydiyl, alkyleno, alkanyl, alkenyl, alkoxy, aryl, arylalkyl, arylaryl, aryldiyl, or aryleno; and R is a substituted or unsubstituted alkyl, alkynyl, alkydiyl, alkyleno, alkanyl, alkenyl, alkoxy, aryl, arylalkyl, arylaryl, aryldiyl, or aryleno, wherein R comprises a carbon chain of 2 to 30 carbon atoms. The pigment compositions have improved lacing resistance, dispersibility, stability or combinations thereof.

6 Claims, 3 Drawing Sheets

Scheme 1: A possible mechanism of the reaction between KR TTS and a hydroxyl group on the particle surfaces.

Scheme 2. Reaction between KR TTS molecules and the hydroxylated TiO₂ particle surfaces.

The general structures, trade names and CAS nomenclatures of some coupling agents.

COMPOSITIONS AND METHODS COMPRISING TITANIUM DIOXIDE PIGMENTS AND COUPLING AGENTS

BACKGROUND OF THE INVENTION

Titanium dioxide pigments are used in a wide variety of applications such as in paints, plastics, paper, laminates, siding, corrosion resistant primers, decorative topcoats, or other coating systems. In general, the titanium dioxide pigments used in these applications are either in anatase or rutile form and made by well-known processes such as the sulfate or chloride process.

In the sulfate process, ore-containing titanium is reacted with sulfuric acid and titanium is obtained by selective precipitation, washing, followed by calcination of the titanium hydrate to form anatase or rutile titanium dioxide. The chloride process involves reacting ore containing titanium with chlorine to produce titanium tetrachloride, which is then purified and oxidized to form titanium dioxide, usually in rutile form.

The anatase or rutile titanium dioxide may be further processed, for example, by treating the titanium dioxide ($TiO_2$) with inorganic compounds such as, for example, alumina, phosphate, zirconia, and silica to enhance properties of the pigment. For plastics applications, the titanium dioxide may be further treated with organic compounds to make the $TiO_2$ hydrophobic for introduction into the particular plastics system.

Numerous hydrophobic agents, for example, polyols, phosphorylated fatty acid derivatives, organophosphates, dialkylsulfosuccinates and various silicone-based agents have been used to make $TiO_2$ hydrophobic. Some silicone-based agents used for making the $TiO_2$ hydrophobic include silanes, siloxanes, polysiloxanes and substituted silanes, hydrosylates and condensates of these silanes, siloxanes and polysiloxanes agents.

The hydrophobic agent may be added to the $TiO_2$ when it is in the wet or dry phase to give $TiO_2$ the desired performance. In the wet phase, the hydrophobic agent can be applied to a slurry of $TiO_2$, with agitation and allowed to age for a certain length of time before the pigment is washed, dried and micronized. Alternatively, in the wet phase, the hydrophobic agent can be applied directly to the filter cake or spray dryer feed slurry before drying and micronizing. When the titanium dioxide pigment is in the dry phase, e.g., without any solvent present, the hydrophobic agent may be sprayed onto the dry $TiO_2$ particle surface at the micronization stage.

Unfortunately, some of the hydrophobic agents have certain disadvantages. For example, some hydrophobic agents require that the $TiO_2$ surface is first treated with inorganic compounds, such as alumina, in order to facilitate the attachment of the hydrophobic agent onto the $TiO_2$ surface. Some hydrophobic agents can only be applied to the $TiO_2$ solely when the $TiO_2$ is in the wet phase or solely when it is in the dry phase. Some hydrophobic agents are not suitable for high temperature applications because they do not form a strong bond with the $TiO_2$ surface and migrate from the surface of the pigment leading to potential problems with heat sealing, print clarity and other related problems in the final pigmented product.

Because of the disadvantages mentioned above, there is a need for new titanium dioxide pigments and methods for producing commercially acceptable titanium dioxide pigments at high throughput rates that have improved lacing resistance, dispersibility, stability or combination thereof.

SUMMARY OF THE INVENTION

In various embodiments, coupling agents are provided for treating inorganic pigments, such as for example, $TiO_2$, $SiO_2$, $CaCO_3$ and other metal oxides for use in polymer matrices. These coupling agents may be applied to the inorganic oxide to give the pigment better performance properties, such as for example, improved lacing resistance, dispersibility, stability or combination thereof.

In various embodiments, a pigment is provided comprising titanium dioxide and a coupling agent having the formula:

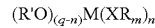

wherein:

M is Ti, Zr, Sn, or Al;

X is $-CO_2$, $=PO_2$, $-PO_2(OH)$, $=PO_2PO_2(OH)$, or $-SO_3$;

m is 1 or 2;

n is 1, 2, or 3 and q=4 when M is Ti, Zr or Sn, or n is 1 or 2 and q is 3 when M is Al;

R' is a substituted or unsubstituted alkyl, alkynyl, alkydiyl, alkyleno, alkanyl, alkenyl, alkoxy, aryl, arylalkyl, arylaryl, aryldiyl, or aryleno; and R is a substituted or unsubstituted alkyl, alkynyl, alkydiyl, alkyleno, alkanyl, alkenyl, alkoxy, aryl, arylalkyl, arylaryl, aryldiyl, or aryleno, wherein R comprises a carbon chain of 2 to 30 carbon atoms.

In various embodiments, a method of making a pigment is provided comprising mixing a coupling agent with a base particle to make the pigment, the coupling agent having the formula:

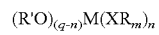

wherein

M is Ti, Zr, Sn, or Al;

X is $-CO_2$, $=PO_2$, $-PO_2(OH)$, $=PO_2PO_2(OH)$, or $-SO_3$;

m is 1 or 2;

n is 1, 2, or 3 and q=4 when M is Ti, Zr or Sn, or n is 1 or 2 and q=3 when M is Al;

R' is a substituted or unsubstituted alkyl, alkynyl, alkydiyl, alkyleno, alkanyl, alkenyl, alkoxy, aryl, arylalkyl, arylaryl, aryldiyl, or aryleno; and R is a substituted or unsubstituted alkyl, alkynyl, alkydiyl, alkyleno, alkanyl, alkenyl, alkoxy, aryl, arylalkyl, arylaryl, aryldiyl, or aryleno, wherein R comprises a carbon chain of 2 to 30 carbon atoms.

In various embodiments, a method is provided for making titanium dioxide pigment having improved lacing resistance, dispersibility, stability or combinations thereof comprising mixing a coupling agent with titanium dioxide to make the titanium dioxide pigment.

Additional features and advantages of various embodiments will be set forth in part in the description that follows, and in part will be apparent from the description, or may be learned by practice of various embodiments. Other advantages of various embodiments will be realized and attained by means of the elements and combinations particularly pointed out in the description and appended claims.

Figure 1:
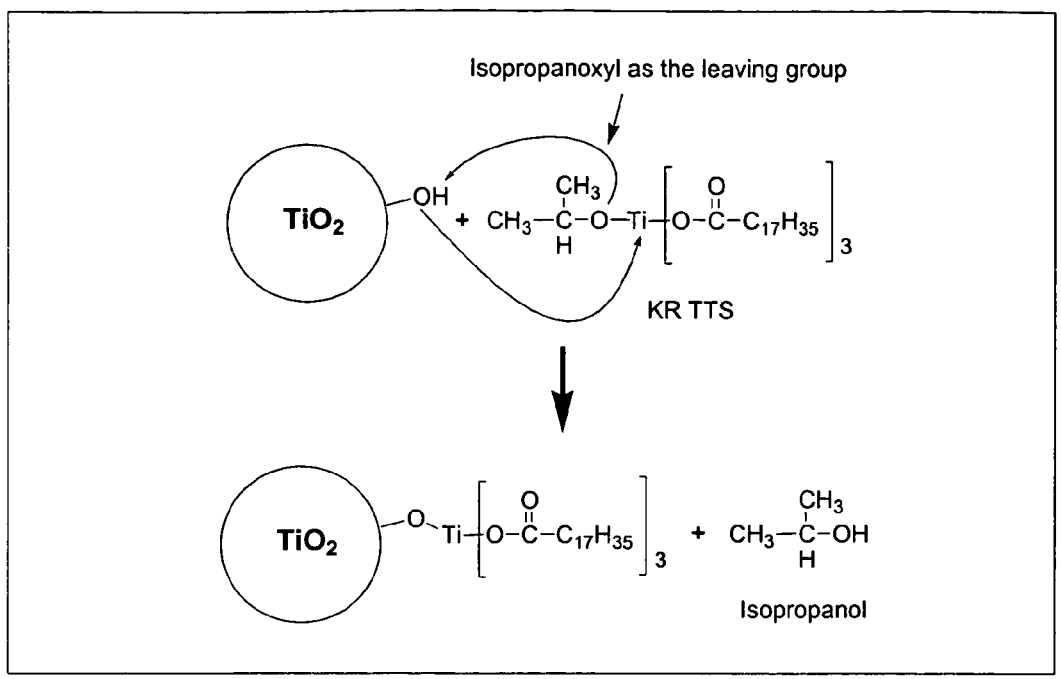
FIG. 1 illustrates a possible mechanism of the reaction between KR TTS and a hydroxyl group on the particle surfaces.

It is to be understood that the figures are not drawn to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION OF THE INVENTION

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth, the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

It is noted that, as used in this specification and the appended claims, the singular forms "a," "an," and "the," include plural referents unless expressly and unequivocally limited to one referent. Thus, for example, reference to "a monomer" includes two or more monomers.

Reference will now be made in detail to certain embodiments of the invention. While the invention will be described in conjunction with the illustrated embodiments, it will be understood that they are not intended to limit the invention to those embodiments. On the contrary, the invention is intended to cover all alternatives, modifications, and equivalents, which may be included within the invention as defined by the appended claims.

Pigments

Pigments include any substance that imparts color to another substance or mixture. The pigment may be inorganic, organic or combinations thereof. Examples of inorganic pigments include, but are not limited to, oxides of silicon, titanium, zirconium, zinc, magnesium, aluminum, iron or combinations thereof, calcium carbonate, kaolin, talc, mica, or combinations thereof. The inorganic pigment can be used in the present compositions in a wide variety of weight-percentages easily determined by those skilled in the art.

Examples of organic pigments include, but are not limited to, perylene, perinone, quinacridone, quinacridonequinone, anthraquinone, anthanthrone, benzimidazolone, disazo condensation, azo, indanthrone, phthalocyanine, triarylcarbonium, dioxazine, aminoanthraquinone, diketopyrrolopyrrole, thioindigo, thiazineindigo, isoindoline, isoindolinone, pyranthrone or isoviolanthrone pigments or combinations thereof.

In various embodiments, the pigment comprises titanium dioxide base particles. Titanium dioxide base particles are produced commercially in two crystalline forms, namely the rutile form which is usually produced by the chloride and sulfate processes and the anatase form which is usually produced by the sulfate process. Both of these processes are well known to those skilled in the art. The titanium dioxide can be a combination of rutile and anatase.

In various embodiments, the titanium dioxide particles can be used directly from the reactor without further processing steps before the coupling agent is added and mixed. In various embodiments, the titanium dioxide can be washed substantially free of salts (if any) adhering to the pigment and/or not adhering to the pigment, dried, and can be added to a micronizer. The coupling agent is added prior to or after the micronization step. In various embodiments, the coupling agent is added into the partially dewatered spray dryer feed $TiO_2$ paste before it is added to the spray dryer.

It is not necessary that the titanium dioxide be wet treated before it is mixed with the coupling agent. However, if wet treatment of the titanium dioxide is desired, the titanium dioxide can be incorporated into an aqueous or non-aqueous slurry and then optionally wet treated with compounds such as, for example, alumina, silica, zirconia, phosphate compounds or combinations thereof. These compounds are capable of providing oxide or hydrous oxide coatings on the base titanium dioxide particle. Slurries of titanium dioxide base can be made by methods known in the art. Slurries can have a titanium dioxide solids content of, preferably, about 1% to about 60% or higher. Preferred particle size for the titanium dioxide comprises from between about 0.1 and about 1 micron. The temperature and pH of the slurry can easily be determined by those skilled in the art to facilitate the wet treatment process. The slurry can be heated using conventional heating means known by those skilled in the art, such as for example, by steam.

After the optional wet treatment has occurred, upon completion of the addition of the alumina, silica, zirconia, phosphate compounds or combinations thereof. The resultant titanium dioxide pigment can be recovered by filtration. The pigment can be washed substantially free of salts (if any) adhering to the pigment and/or not adhering to the pigment, dried and then subjected to grinding or milling techniques known in the art. The washed and dried pigment may be micronized in a steam or air micronizer at intensities known by those skilled in the art.

Optionally, a polyol such as for example, trimethylolpropane (TMP), trimethylolethane (TME) or pentaerythritol, or the like, can be added to the pigment during steam or air micronization at about 0.2% to 0.4% based on the weight of the titanium dioxide pigment.

In various embodiments, titanium dioxide pigments may be produced either by a continuous or batch processes. Typically, continuous processes involve continuous feed pipelines with cascading treatment tanks with separate addition points for addition of hydrous metal oxides (e.g., silica, alumina), pH adjusters and other additives. Continuous processes involve residence times of less than about 120 minutes, preferably from about 5 minutes to about 60 minutes, and more preferably from about 10 minutes to about 45 minutes for silica and alumina deposition on the titanium dioxide pigment. Batch processes typically require longer treatment times.

If size reduction of the pigment is required, grinding or milling techniques can be used. Grinding or milling includes size reduction techniques to reduce the solids content. Thus, grinding or milling can be distinguished from mixing in that in mixing, there is substantially no size reduction of pigments. Typically, grinding requires use of grinding or milling media that is used to reduce the size of pigment particles. Some examples of grinding or milling media includes ball or media mills, cone and gyratory crushers, disk attrition mills, colloid and roll mills, screen mills and granulators, hammer and cage mills, pin and universal mills, impact mills and breakers, jaw crushers, jet and fluid energy mills, roll crushers, disc mills, vertical rollers, pressure rollers, or the like.

Once the pigment is made, it can be introduced into a coatings or plastics system. Examples of coatings include, but are not limited to, paint, stain, varnish, lacquer, plastic, siding or the like. Examples of plastics systems include polymerizable monomers, polymers or combinations thereof. Polymers that may be used in various embodiments include, but is not limited to, at least one of: polymers of unsubstituted ethylene monomers, including polyethylene, polypropylene, polybutylene, and copolymers of ethylene with alpha-olefins containing 4 to 12 carbon atoms or vinyl acetate; vinyl homopolymers, acrylic homopolymers and copolymers, polyamides, polycarbonates, polystyrene, acrylonitrile-butadiene-styrenes or polyethers, polyvinylchloride, polyurethanes, polysulfones, polyimides, polyesters or chlorinated polyesters, polyoxyethylenes, phenolics, alklyds, amino resins, epoxy resins, phenoxy resins or acetal resins.

In various embodiments, the treated pigment can be combined with the polymer and have a loading of up to, for example, about 85% by weight, based on the total weight. In various embodiments, a loading of treated pigment of about 50% to about 85% by weight based on the total weight can be used. This loading can be used as a masterbatch.

Methods of making a masterbatch are known to those of ordinary skill in the art. For example, the masterbatch may be created by combining the pigment and the polymer using a BR Banbury Mixer.

In various embodiments, the coating system may comprise a solvent. Suitable solvents include, for example, aqueous, non-aqueous solvents or combinations thereof. Aqueous solvents comprise water. Some examples of non-aqueous solvents, include, but are not limited to, methyl acetate, ethyl acetate, isopropyl acetate, methoxypropylacetate, methanol, isopropyl alcohol, butanol, methoxypropanol, mineral spirits, petroleum, methylethylketone, ethylethylketone, tetrahydrofuran, butyl acetate, butylglycol, hydrocarbons, or combinations thereof.

In various embodiments, the plastic systems includes plasticizers and/or colorants. The nature and amount of these additives to use are known to those of ordinary skill in the art and may be dependent on the performance properties of the plastics system.

Colorants include one or more substances that contribute to the color of the plastics system. Some examples of colorants include pigments and dyes that can be added to the plastics system to make specific colors.

Coupling Agents

The titanium dioxide comprises a coupling agent. Coupling agents include compounds that are molecular bridges that link two substances together. Typically, coupling agents can link substances having dissimilar properties such as for example, hydrophilic and hydrophobic substances. For example, the coupling agent can react with hydroxyl groups at the pigment interface that can result in the formation of an organic layer on the pigment surface.

In various embodiments, the coupling agents include titanates, zirconates, stannates, aluminates or combinations thereof. Structurally, coupling agents comprise an atom chosen from IIIA, IVA or IVB group elements that are coordinated with, for example, alkyl groups to give hydrophobicity and hydrolysable ligands to serve as leaving groups. For example, typically, the silane compounds used for $TiO_2$ surface treatment usually have one or more long alkyl chain(s) and one to three reactive Si—Cl or Si—OR bonds to satisfy a tetravalent coordination around the Si atoms. When a silane is added into an aqueous slurry treatment tank, it will often violently react with water to produce cross-linked siloxane oligomers, which would form encapsulation around $TiO_2$ particles. In comparison, the structures and reactivity of titanates and zirconates are more diverse. Titanates and zirconates when contacted with the surface of a pigment, for example titanium dioxide, react with the OH groups on the surface of the pigment and form an organic layer on the surface of the pigment by covalent attachment and with the removal of the leaving group. FIG. 1 illustrates a possible mechanism of the reaction between KR TTS and a hydroxyl group on the particle surfaces.

Figure 2:
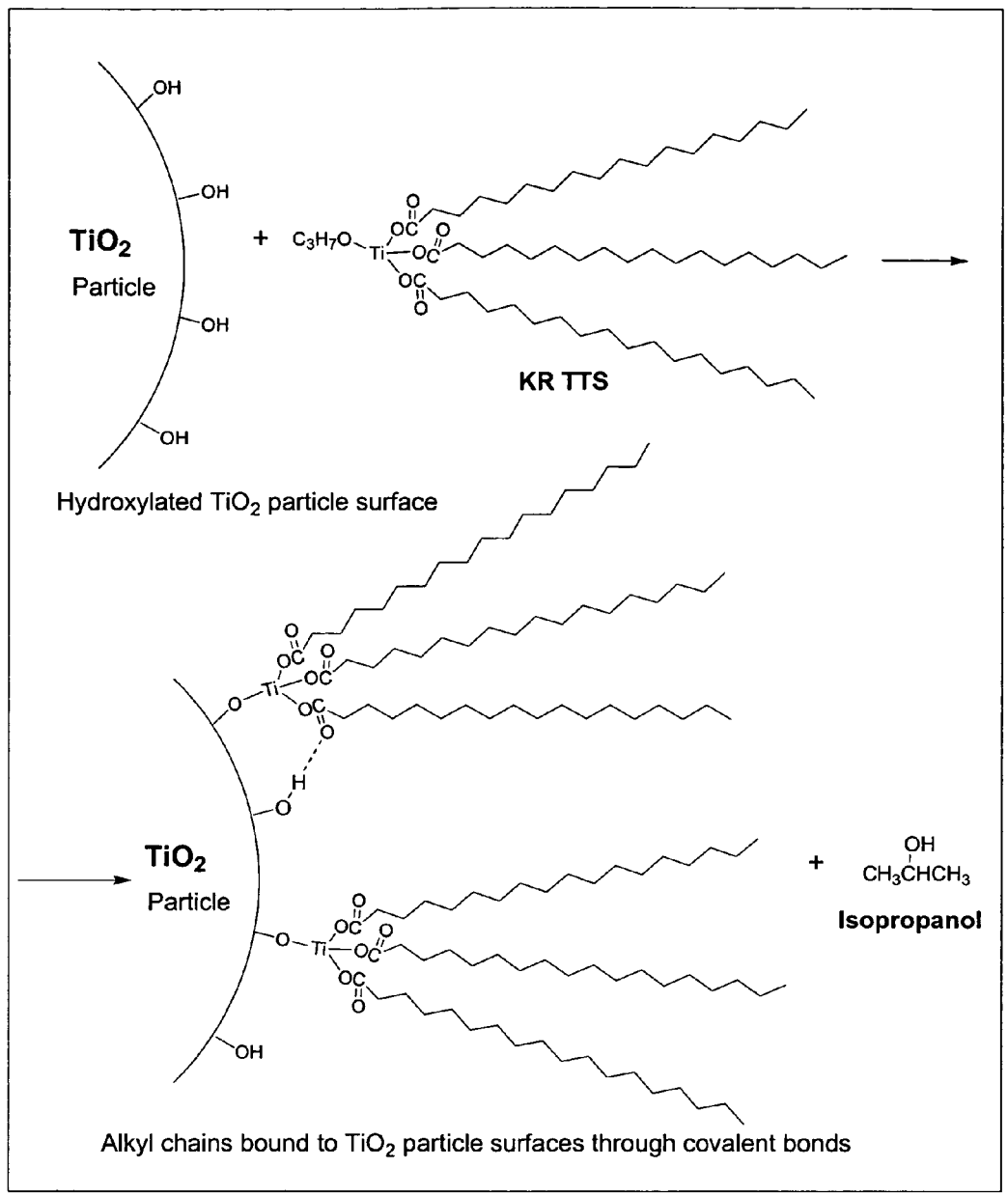
FIG. 2 illustrates the reaction scheme between KR TTS molecules and the hydroxylated $TiO_2$ particle surfaces.

In general, the coupling agent allows the titanium dioxide pigment to become hydrophobic. Hydrophobicity of the $TiO_2$ particles comes from, for example, the long alkyl chains retained on the $TiO_2$ surface. For example, FIG. 2 illustrates in Scheme 1 the reaction between KR TTS molecules and the hydroxylated $TiO_2$ particle surfaces. The more alkyl chains remain on the surface, the more hydrophobic the $TiO_2$ particle will become. Our treatment methods show high retention of these organics on the surface. See, for example, the carbon content data, Example 6.

When pigments are treated with an organic compound, the organic molecules may interact with the pigment surface in various manners, such as through Van del Waals interactions, hydrogen bonding, encapsulation, and covalent bonding. Covalent bonding would enhance the organics to $TiO_2$ particle surfaces bonding strength, giving rise to high thermal stability, chemical stability, and better processibility of the treated pigment. Covalent bonding in the organotitanate-$TiO_2$ system was shown by the thermal desorption analysis in Example 7.

In various embodiments, the coupling agent comprises organotitanates. Typically, organotitanates include alkoxytitanium esters, titanium chelates and titanium acylates, which have Ti—O—C linkages in their molecules.

Organo-titanates can be prepared from alkyl titanates and organic acids, by methods known in the art. Organotitanates are commercially available from, for example, Kenrich Petrochemicals, Inc. of Bayonne, N.J.

When organotitanates are employed, they may be easily and flexibly incorporated into any step of the existing pigment production process. In various embodiments, the organotitanate can be added to a washed filter cake prior to spray drying followed with a high intensity milling device, or to the micronizer feed prior to or concurrent with micronization, or to the finished pigment after micronization. The organotitanate can be added to a washed filter cake at normal process operating temperatures. If the organotitanate is added to dry untreated $TiO_2$, such as an oxidizer discharge or micronizer feed or discharge, a tumbler blender, equipped with a solid-liquid agitator or intensifier bar, is the preferred equipment for the addition. This equipment promotes a homogeneous mixing of the organotitanates and TiO$_2$, the coating of the treatment agents onto the pigment particle surfaces, and the even distribution between the organotitanates and the pigment through fine spraying, and the breakdown of agglomerates and fluidization.

In various embodiments, suitable coupling agents have the formula:

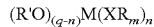

$$(R'O)_{(q-n)}M(XR_m)_n$$

wherein M is Ti, Zr, Sn, or Al;

X is —CO$_2$, =PO$_2$, —PO$_2$(OH), =PO$_2$PO$_2$(OH), or —SO$_3$;

m is 1 or 2;

n is 1, 2, or 3 and q is 4 when M is Ti, Zr or Sn, or n is 1 or 2 and q is 3 when M is Al;

R' is a substituted or unsubstituted alkyl, alkynyl, alkydiyl, alkyleno, alkanyl, alkenyl, alkoxy, aryl, arylalkyl, arylaryl, aryldiyl, or aryleno; and R is a substituted or unsubstituted alkyl, alkynyl, alkydiyl, alkyleno, alkanyl, alkenyl, alkoxy, aryl, arylalkyl, arylaryl, aryldiyl, or aryleno, wherein R comprises a carbon chain of 2 to 30 carbon atoms.

In the above formula, the R'O group comprises the leaving group, which does not necessarily dissociate from, or "leave" the coupling agent when the compound is deposited onto TiO$_2$ surface. In embodiments where the leaving group dissociates, a covalent bond between the remaining coupling agent species and the TiO$_2$ surface will form. In embodiments where the leaving group remains, there may be no covalent bonds formation, but, the coupling agent may be still bond to the TiO$_2$ through other kinds of chemical or physical interactions and may still be stable on TiO$_2$ surfaces.

"Alkyl" refers to a saturated or unsaturated, branched, straight-chain or cyclic monovalent hydrocarbon radical derived by the removal of one hydrogen atom from a single carbon atom of a parent alkane, alkene or alkyne. Typical alkyl groups include, but are not limited to, methyl; ethyls such as ethanyl, ethenyl, ethynyl; propyls such as propan-1-yl, propan-2-yl, cyclopropan-1-yl, prop-1-en-1-yl, prop-1-en-2-yl, prop-2-en-1-yl, cycloprop-1-en-1-yl; cycloprop-2-en-1-yl, prop-1-yn-1-yl, prop-2-yn-1-yl, etc.; butyls such as butan-1-yl, butan-2-yl, 2-methyl-propan-1-yl, 2-methyl-propan-2-yl, cyclobutan-1-yl, but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, but-1-yn-1-yl, but-1-yn-3-yl, but-3-yn-1-yl or the like. Where specific levels of saturation are intended, the nomenclature "alkanyl" "alkenyl" and/or "alkynyl" is used, as defined below. "Alkoxy" refers to an alkyl group linked to an oxygen. In preferred embodiments, the alkyl group comprises a carbon chain of 2 to 30 carbon atoms.

"Alkanyl" refers to a saturated branched, straight-chain or cyclic alkyl radical derived by the removal of one hydrogen atom from a single carbon atom of a parent alkane. Typical alkanyl groups include, but are not limited to, methanyl; ethanyl; propanyls such as propan-1-yl, propan-2-yl (isopropyl), cyclopropan-1-yl, etc.; butyanyls such as butan-1-yl, butan-2-yl (sec-butyl), 2-methyl-propan-1-yl (isobutyl), 2-methyl-propan-2-yl (t-butyl), cyclobutan-1-yl, or the like. In preferred embodiments, the alkanyl group comprises a carbon chain of 2 to 30 carbon atoms.

"Akenyl" refers to an unsaturated branched, straight-chain or cyclic alkyl radical having at least one carbon-carbon double bond derived by the removal of one hydrogen atom from a single carbon atom of a parent alkene. The radical may be in either the cis or trans conformation about the double bond(s). Typical alkenyl groups include, but are not limited to, ethenyl; propenyls such as prop-1-en-1-yl, prop-1-en-2-yl, prop-2-en-1-yl, prop-2-en-2-yl, cycloprop-1-en-1-yl; cycloprop-2-en-1-yl; butenyls such as but-1-en-1-yl, but-1-en-2-yl, 2-methyl-prop-1-en-1-yl, but-2-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien1-yl, or the like. In preferred embodiments, the alkenyl group comprises a carbon chain of 2 to 30 carbon atoms.

"Alkynyl" refers to an unsaturated branched, straight-chain or cyclic alkyl radical having at least one carbon-carbon triple bond derived by the removal of one hydrogen atom from a single carbon atom of a parent alkyne. Typical alkynyl groups include, but are not limited to, ethynyl; propynyls such as prop-1-yn-1-yl, prop-2-yn-1-yl, etc.; butynyls such as but-1-yn-1-yl, but-1-yn-3-yl, but-3-yn-1-yl, or the like. In preferred embodiments, the alkynyl group comprises a carbon chain of 2 to 30 carbon atoms.

"Alkyldiyl" refers to a saturated or unsaturated, branched, straight-chain or cyclic divalent hydrocarbon radical derived by the removal of one hydrogen atom from each of two different carbon atoms of a parent alkane, alkene or alkyne, or by the removal of two hydrogen atoms from a single carbon atom of a parent alkane, alkene or alkyne. The two monovalent radical centers or each valency of the divalent radical center can form bonds with the same or different atoms. Typical alkyldiyls include, but are not limited to methandiyl; ethyldiyls such as ethan-1,1-diyl, ethan-1,2-diyl, ethen-1,1-diyl, ethen-1,2-diyl; propyldiyls such as propan-1,1-diyl, propan-1,2-diyl, propan-2,2-diyl, propan-1,3-diyl, cyclopropan-1,1-diyl, cyclopropan-1,2-diyl, prop-1-en-1,1-diyl, prop-1-en-1,2-diyl, prop-2-en-1,2-diyl, prop-1-en-1,3-diyl, cycloprop-1-en-1,2-diyl, cycloprop-2-en-1,2-diyl, cycloprop-2-en-1,1-diyl, prop-1-yn-1,3-diyl, etc.; butyldiyls such as, butan-1,1-diyl, butan-1,2-diyl, butan-1,3-diyl, butan-1,4-diyl, butan-2,2-diyl, 2-methyl-propan-1,1-diyl, 2-methyl-propan-1,2-diyl, cyclobutan-1,1-diyl; cyclobutan-1,2-diyl, cyclobutan-1,3-diyl, but-1-en-1,1-diyl, but-1-en-1,2-diyl, but-1-en-1,3-diyl, but-1-en-1,4-diyl, 2-methyl-prop-1-en-1,1-diyl, 2-methanylidene-propan-1,1-diyl, buta-1,3-dien-1,1-diyl, buta-1,3-dien-1,2-diyl, buta-1,3-dien-1,3-diyl, buta-1,3-dien-1,4-diyl, cyclobut-1-en-1,2-diyl, cyclobut-1-en-1,3-diyl, cyclobut-2-en-1,2-diyl, cyclobuta-1,3-dien-1,2-di-yl, cyclobuta-1,3-dien-1,3-diyl, but-1-yn-1,3-diyl, but-1-yn-1,4-diyl, buta-1,3-diyn-1,4-diyl, or the like. Where specific levels of saturation are intended, the nomenclature alkanyldiyl, alkenyldiyl and/or alkynyldiyl is used. In preferred embodiments, the alkyldiyl group comprises a carbon chain of 2 to 30 carbon atoms.

"Alkyleno" refers to a straight-chain alkyldiyl radical having two terminal monovalent radical centers derived by the removal of one hydrogen atom from each of the two terminal carbon atoms of straight-chain parent alkane, alkene or alkyne. Typical alkyleno groups include, but are not limited to, methano; ethylenos such as ethano, etheno, ethyno; propylenos such as propano, prop[1]eno, propa[1,2]dieno, prop[1]yno, etc.; butylenos such as butano, but[1]eno, but[2]eno, buta[1,3]dieno, but[1]yno, but[2]yno, but[1,3]diyno, etc.; or the like. Where specific levels of saturation are intended, the nomenclature alkano, alkeno and/or alkyno is used. In preferred embodiments, the alkyleno group comprises a carbon chain of 2 to 30 carbon atoms.

"Aryl" refers to a monovalent aromatic hydrocarbon radical derived by the removal of one hydrogen atom from a single carbon atom of a parent aromatic ring system. Typical aryl groups include, but are not limited to, radicals derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. Examples of aryls include, but are not limited to, phenyl, naphthyl or the like.

"Heteroalkyl, heteroalkanyl, heteroalkenyl, heteroalkyldiyl and heteroalkyleno" refer to alkyl, alkanyl, alkenyl, alkynyl, alkyldiyl and alkyleno radicals, respectively, in which one or more of the carbon atoms are each independently replaced with the same or different heteroatomic groups. Typical heteroatomic groups which can be included in these radicals include, but are not limited to, —O—, —S—, —N—, —O—O—, —S—S—, —O—S—, —NR'—, —N=N—, —N(O)N—, —N=N—N'—, —PH—, —P(O)$_2$—, —O—P(O)$_2$—, —SH$_2$—, —S(O)$_2$—, or the like, where each R' is independently hydrogen, alkyl, alkanyl, alkenyl, alkynyl, aryl, arylaryl, arylalkyl, heteroaryl, heteroarylalkyl or heteroaryl-heteroaryl.

"Aryldiyl" refers to a divalent aromatic hydrocarbon radical derived by the removal of one hydrogen atom from each of two different carbon atoms of a parent aromatic ring system or by the removal of two hydrogen atoms from a single carbon atom of a parent aromatic ring system. The two monovalent radical centers or each valency of the divalent center can form bonds with the same or different atom(s). Typical aryldiyl groups include, but are not limited to, divalent radicals derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, pentacene, pentalene, pentaphene, perylene, phenalene, phenanthrene, picene, pleiadene, pyrene, pyranthrene, rubicene, triphenylene, trinaphthalene, or the like.

"Aryleno" refers to a divalent bridge radical having two adjacent monovalent radical centers derived by the removal of one hydrogen atom from each of two adjacent carbon atoms of a parent aromatic ring system. Attaching an aryleno bridge radical, e.g. benzeno, to a parent aromatic ring system, e.g. benzene, results in a fused aromatic ring system, e.g., naphthalene. The bridge is assumed to have the maximum number of non-cumulative double bonds consistent with its attachment to the resultant fused ring system. In order to avoid double-counting carbon atoms, when an aryleno substituent is formed by taking together two adjacent substituents on a structure that includes alternative substituents, the carbon atoms of the aryleno bridge replace the bridging carbon atoms of the structure.

"Arylaryl" refers to a monovalent hydrocarbon radical derived by the removal of one hydrogen atom from a single carbon atom of a ring system in which two or more identical or non-identical parent aromatic ring systems are joined directly together by a single bond, where the number of such direct ring junctions is one less than the number of parent aromatic ring systems involved. Typical arylaryl groups include, but are not limited to, biphenyl, triphenyl, phenylnaphthyl, binaphthyl, biphenyl-naphthyl, or the like.

"Arylalkyl" refers to an acyclic alkyl radical in which one of the hydrogen atoms bonded to a carbon atom, typically a terminal or sp$^3$ carbon atom, is replaced with an aryl radical. Typical arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl, or the like.

The term "substituted" refers to a radical in which one or more hydrogen or carbon atoms are each independently replaced with the same or different substituent(s). Typical substituents include, but are not limited to, —X, —R, —O$^-$, =O, —OR, —O—OR, —SR, —S$^-$, =S, —NRR, =NR, —CX$_3$, —CF$_3$, —CN, —OCN, —SCN, —NCO, —NCS, —NO, —NO$_2$, =N$_2$, P=O, PO$_2$, PO$_3$, PO$_4$, —N3, —S(O)$_2$O$^-$, —S(O)$_2$OH, —S(O)$_2$R, C(O)R, —C(O)X, —C(S)R, —C(S)X, —C(O)OR, —C(O)O—, —C(S)OR, —C(O)SR, —C(S)SR, —C(O)NRR, —C(S)NRR and —C(NR)NRR, where each X is independently a halogen (preferably —F or —Cl) and each R is independently hydrogen, alkyl, alkanyl, alkenyl, alkynyl, aryl, arylalkyl, arylaryl, heteroaryl, heteroarylalkyl or heteroaryl-heteroaryl. The actual substituent substituting any particular group will depend upon the identity of the group being substituted.

Figure 3:
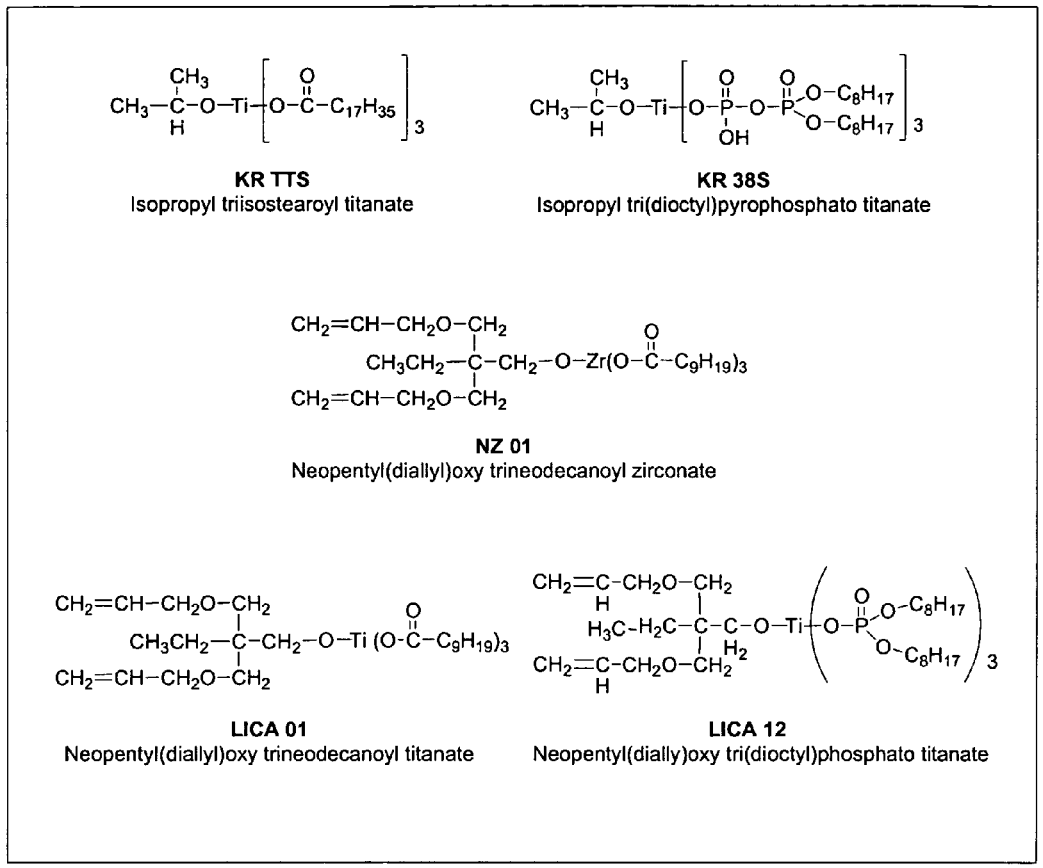
FIG. 3 illustrates the general structures, trade names and CAS nomenclatures of some Kenrich coupling agents.

In various embodiments, the coupling agents include, but are not limited to, isopropyl triisostearoyl titanate (KR TTS), neopentyl(diallyl)oxy trineodecanoyl titanate (LICA 01), neopentyl(diallyl)oxy tri(dioctyl)phosphato titanate (LICA 12), isopropyl tri(dioctyl)pyrophosphato titanate (KR 38S), or neopentyl(diallyl)oxy trineodecanoyl zirconate (NZ01) or combinations thereof. The general structures of these coupling agents are shown in FIG. 3.

Preferred coupling agents include, but are not limited to, isopropyl triisostearoyl titanate (KR TTS), neopentyl(diallyl) oxy trineodecanoyl titanate (LICA 01), neopentyl(diallyl) oxy tri(dioctyl)phosphato titanate (LICA 12), isopropyl tri (dioctyl)pyrophosphato titanate (KR 38S) or combinations thereof.

The addition of reactants (pigment, coupling agent, etc.) can be added in any order. In various embodiments, the coupling agent can be added after oxidation/calcination or milling, or before, during or after wet treating, washing, filtering, drying or micronizing the pigment.

In various embodiments, the coupling agent is added in an amount of from about 0.1 to about 10 weight percent, more preferably from about 0.1 to about 5 percent based on the weight of the pigment, e.g., titanium dioxide.

In various embodiments, the coupling agent can be added to the pigment particles after they are recovered from the oxidizer. For example, in a wet mixing method, oxidizer discharge titanium dioxide pigment was washed with water to reduce salt content. The coupling agent was added at ambient temperature to the paste and thoroughly mixed and dried.

In various embodiments, the coupling agent can be added to the pigment particles after they are recovered from the oxidizer. For example, in a dry mixing method, a coupling agent was mixed with oxidizer discharge titanium dioxide pigment with or without a solvent, which was subsequently dried.

Mixing the coupling agent with the pigment can be accomplished by mixing methods known in the art. Thus, the mixing may be accomplished, for example, with a blender or any other mixing device. Blade speeds of 1500 feet per minute or higher, for example 3600 feet per minute to 5000 feet per minute, are generally preferred for mixing. In various embodiments, the mixing and addition of the coupling agent can occur at temperatures of from about 10° C. to about 270° C.

It has been found that by the addition of the coupling agent, commercially acceptable pigments can be produced at high throughput rates. In various embodiments, the pigment can be used directly from the oxidizer without the need for extensive wet treatment steps.

After the coupling agent is added, the drying temperature can easily be determined by those skilled in the art and can range from 0° C. to 270° C. to facilitate coupling agent adherence to the surface of the pigment. Typically, drying can occur by devices or methods known in the art for example, air drying, baking, micronizer, fluid bed dryers, air stream drying systems, flash dryers, or the like or by vacuum.

Pigment Properties

In various embodiments, the titanium dioxide pigments have improved lacing resistance, dispersibility, stability or combinations thereof. Lacing is an art recognized term where imperfections are observed in the film manifested as holes. Typically, the lacing phenomenon is related to temperature, film gauge, pigment loading, and total content of volatile components. Moisture or other volatile components in the resin or additives can phase change to gas under pressure in the extruder or die, then upon exiting the die, to form voids in the film. This may be caused, for example, by not properly drying a hygroscopic polymer or by subsequent moisture pick up by the pigment prior to processing. Lacing resistance is the ability of the pigment, when incorporated into the plastics system, to resist the formation of holes or voids in the plastics system. Lacing or lacing resistance can be measured by methods known in the art.

Typically, lacing resistance is an important property of inorganic oxides used in polyethylene film applications. Lacing is believed to be a measure of concentrate volatility at specific weight percent pigment loadings and processing temperatures.

In various embodiments, lacing tests can be conducted on 50% $TiO_2$ concentrate samples prepared according to the method described. The concentrates can be conditioned for 48 hours at 23° C. and 50% relative humidity. The concentrates can then be let down into a LDPE 722 to achieve a 20% loading of $TiO_2$ in the final film. Lacing evaluations can be run on a 1" extruder equipped with a slot die for fabricating cast films. A temperature profile of 625° F. die, 515° F. clamp ring, 415° F. zone 3, 350° F., zone 2, 300° F. zone 1 can be used. The screw speed can be set at about 90 rpm. A 25.4 cm polished chrome chill roll can be used to cool and transport the films and can be set to maintain a 75 mm film thickness. The chill roll distance from the die lips can be about 22 mm and the temperature can be about 27° C.

After, the $TiO_2$/LDPE mix can be placed in the hopper, the material can be allowed to run until the appearance of white in the clear film is first noted. To ensure the concentration of $TiO_2$ in the film stabilizes, a two minute time interval can be allowed before observations are recorded and a film sample taken. The extruder can then be purged with LDPE until the film returns to clear. Lacing performance can be ranked by counting the relative size and number of holes generated in a film sample laid out on a dark surface. A 1.0-3.0 rating system can be used. A rating of 1 is given to films with no lacing, 2 is given to films showing the onset of lacing and 3 is given to films with extreme lacing. Increments of 0.1 are used to give some indication of relative performance between the samples.

In various embodiments, improved lacing resistance includes, but is not limited to, up to a rating between 1.0 and 1.2.

In various embodiments, the pigments will have improved dispersibility compared to pigments that do not contain the coupling agent. Dispersibility includes processes of breaking up agglomerates of pigment particles into individual particles, wetting the individual particles out and preventing the reagglomeration of the particles. Dispersibility is determined by methods known in the art, such as, for example, by a 75% extrusion dispersion test method.

In various embodiments, the 75% extrusion dispersion test method involves testing $TiO_2$ dispersion using a small-scale laboratory extrusion apparatus, where $TiO_2$ is dispersed into organic polymers and the relative amount of pigment trapped onto screens of extruder screen packs is measured. Tests can be conducted using 75% $TiO_2$ concentrates in low density polyethylene prepared using a Haake 3000 Rheomix mixer. The mixer can be controlled and monitored with a Haake 9000 Rheocord Torque Rheometer. 337.7 grams of micronized $TiO_2$ and 112.6 grams of NA209 LDPE manufactured by Equistar can be dry blended and added to the 75° C. mixing chamber with rotors operating at 50 rpm. The mixer temperature can be programmed to increase to 120° C. one minute after the dry blend is introduced to the mixing chamber. After a steady state mixture is achieved, the compound is mixed for an additional 3 minutes. The compound is removed from the chamber and can be granulated using a Cumberland crusher.

Dispersion tests can be conducted using a Killion single screw extruder, model KL-100 equipped with a 20:1 length to diameter screw. The extruder can be preheated at 330, 350, 390 and 380° F. from zone 1 to the die, respectively, and operated at 70 rpm. A purge of 1000 grams of NA952 LDPE manufactured by Equistar can run through the system, and a new screen pack can be installed. The screen pack can comprise 100/500/200/100 mesh screens from the die towards the extruder throat. After temperature stabilization, 133.33 grams of granulated 75% $TiO_2$ concentrate can be fed into the extruder. This can be followed with 1500 grams of NA952 purge as the feed hopper empties. After the LDPE purge is extruded, the screens can be removed, separated and tested using a relative count technique from the measurements from an X-ray fluorescence spectrometer. The number of Ti counts per second can be obtained for the 100, 200 and 500 mesh screens in the pack and totaled to obtain the dispersion result. A count result of less than 5000 cps is considered to represent excellent dispersion.

In various embodiments, improved dispersibility includes, but is not limited to, reducing the total Ti count rate in the dispersion test method specified above to below 4,000 cps.

Stability includes the ability of the pigment to resist thermal change over a wide temperature range. For example, once the coupling agent is added to the pigment, the coupling agent species adheres via covalent bond to the pigment surface and resist alteration over time when the pigment is further processed for the end use application. Pigment stability can be determined by methods known in the art. Some methods of measuring stability include, but are not limited to, temperature programmed desorption, thermogravitational analysis, solvent extraction, hydrolysis test or the like.

In various embodiments, improved stability includes resistance to water or moisture attack over an extended period of time. In various embodiments, improved stability includes the sustained integrity of the organic species at the $TiO_2$ surfaces at a temperature close to about 400° C.

Having now generally described the invention, the same may be more readily understood through the following reference to the following examples, which are provided by way of illustration and are not intended to limit the present invention unless specified.

EXAMPLES

These examples show that pigments made using coupling agents have dispersibility, stability and lacing resistance, similar to or better than commercially available pigments.

Comparative Example 1

Current leading high-performance hydrophobic $TiO_2$ pigment is treated with reactive organosilanes. Comparative example 1 shows how one of such $TiO_2$ pigment is treated with Hexyltrichlorosilane (HTCS) and its performance. It is produced by the wet treatment in which treating agent is added to a dilute raw $TiO_2$ slurry before aging, filtration, drying and micronization. A slurry of $TiO_2$ and water was prepared in the following manner. Sufficient untreated $TiO_2$ was added to a glass treatment tank and diluted with water to obtain a slurry containing 1,000 grams of $TiO_2$ at a concentration of 350 grams/liter. The initial pH of this slurry was about 2.6. The slurry was heated to 70° C. and agitated with a bow-tie mixer at 260 rpm. Sufficient $H_3PO_4$ was added into the treatment tank to adjust its pH to 2.0. 10.0 grams of HTCS was then added into the tank using a syringe over a period of 10 minutes. The slurry was agitated at 350 rpm. After the pigment was aged for one hour, a 50% NaOH solution was added into the tank to adjust the pH of the slurry to 8.0. As the slurry became more viscous when the pH rose, the agitation speed was increased to 580 rpm, in order to improve the mixing. The HTCS treated pigment slurry was filtered and washed with hot de-ionized water. The filter cake was dried in an oven at 110° C. for about 12 hours. The dried filter cake was forced through an 8 mesh screen and steam micronized at 500° F.

Lacing evaluations were conducted by measuring the relative size and number of holes generated in a film sample laid out on a dark surface, and the pigment gave excellent lacing resistance with a rating of 1.1. Dispersion assessments were based on the total titanium XRF counting rates of the 100, 200 and 500 mesh screens used in the extrusion of 75% $TiO_2$ in LDPE concentrates. This pigment gave excellent dispersion of 580 counts per second (cps).

Example 1

Example 1 shows the performance of organotitanates (KR TTS and LICA 01) treated $TiO_2$ pigment of which the treatment method is the same as that of comparative example 1, namely the organotitanate is added to a dilute $TiO_2$ slurry before aging, filtration, drying and micronization.

4,000 grams of pigment slurry containing 1,480 grams of $TiO_2$ was heated in a glass container to 70° C. and agitated at 260 rpm with a bow-tie mixer. The initial pH was 2.55. 7.40 grams of the organotitanate compound was drop-wise added into the slurry using a syringe. During the process, the viscosity of the slurry increased, so that the agitation had to be raised to 630 rpm for a thorough mixing. After finishing the chemical addition, the slurry was aged for 60 min. It was then neutralized to pH 7.0 with 14.4 mL of 50% NaOH. The slurry was filtered and washed with de-ionized water three times. The filter cake was dried in an oven at 110° C. overnight. The dried filter cake was forced through an 8 mesh screen and then steam micronized.

The lacing evaluation for both $TiO_2$ pigments treated with 0.5% isopropyl tri(isostearoyl) titanate (KR TTS) and 0.5% neopentyl(diallyl)oxy trineodecanoyl titanate (LICA 01) treated pigments have a rating of 1.2. The dispersion count for the 0.5% KR TTS treated $TiO_2$ sample is 40,000 cps.

Example 2

In this example, $TiO_2$ was treated with neopentyl(diallyl) oxy trineodecanoyl zirconate (NZ 01) in an aqueous slurry. This treatment process is similar to Example 1. 3,962 grams of pigment slurry containing 1,482 grams of $TiO_2$ was heated in a glass container to 70° C. and agitated at 220 rpm with a bow-tie mixer. The initial pH was 2.80. Within 10 minutes, 7.41 grams of the organozirconate compound NZ 01 was drop-wise added into the slurry using a syringe. After finishing the chemical addition, the slurry was aged for 60 minutes while agitated at 310 rpm. It was then neutralized to pH 7.2 with 14.8 mL of 50% NaOH. The slurry was filtered and washed with de-ionized water three times. The filter cake was dried overnight in an oven at 110° C. The dried filter cake was forced through an 8 mesh screen and then steam micronized. The lacing evaluation for the $TiO_2$ pigments treated with 0.5% neopentyl(diallyl)oxy trineodecanoyl zirconate showed a rating of 1.2.

Example 3

In this example, 0.5% organotitanate compounds were added to an untreated and washed $TiO_2$ filter cake, then dried and micronized. An untreated and washed $TiO_2$ filter cake, containing 3,000 grams of $TiO_2$, was placed in a glass container and stirred using a Dispermat at 1000 rpm. The paste was heated to 50° C. Fifteen grams of organotitanate compound was added into the paste drop-wise over a period of 10 minutes. The paste was then allowed to thoroughly mix with the chemicals for another 5 minutes and then transferred into a ceramic container, which was dried in an oven at 110° C. overnight. The dried pigment cake was forced through an 8-mesh sieve and steam-micronized at 500° F.

Evaluations gave a lacing rating of 1.2 and a dispersion count rate of 30,300 cps to the $TiO_2$ treated with 0.5% isopropyl tri(isostearoyl) titanate (KR TTS). A lacing of 1.0 and dispersion of 2,190 cps was given to the $TiO_2$ treated with 0.5% neopentyl(diallyl)oxy trineodecanoyl titanate (LICA 01).

Example 4

In this example, organotitanate was mixed with dry $TiO_2$ in a Patterson-Kelly batch blender. An oven-dried untreated $TiO_2$ filter cake was forced through an 8-mesh sieve. A sample of the cake described above, containing 3,000 grams of $TiO_2$, was loaded into a Patterson-Kelley batch blender equipped with an intensifier bar. While the blender is on, 15.0 grams of organotitanate was fed to the intensifier bar in five minutes to spray onto the crumbled filter cake. A small amount of isopropanol can be used to dilute the compound to reduce its viscosity, or directly added into the dosing line after injection of the compound in order to wash the tubing and reduce the loss of the viscous chemical. The treated sample was mixed for five more minutes after finishing the chemical addition. Then the machine was turned off and the treated pigment was collected.

The slightly damp powder due to the isopropanol used to wash the dosing line was oven dried at 110° C. overnight and steam-micronized to give the final product. Lacing evaluation of the treated pigments showed a lacing rating of 1.1 for both isopropyl tri(isostearoyl) titanate (KR TTS) and neopentyl (diallyl)oxy trineodecanoyl titanate (LICA 01). The dispersion evaluation showed an XRF count rate of 4,000 cps for isopropyl tri(isostearoyl) titanate (KR TTS) and 640 cps for neopentyl(diallyl)oxy trineodecanoyl titanate (LICA 01).

Example 5

In this example, micronized $TiO_2$ base pigment was surface treated with organotitanate compounds KR TTS, LICA 01 and LICA 12 using the same dry treatment process as described in Example 4. An oven-dried untreated $TiO_2$ filter cake was forced through an 8-mesh sieve and steam-micronized to obtain an untreated pigment. The micronized untreated $TiO_2$ was loaded into a Patterson-Kelley blender and treated with 0.5% organotitanate in the same manner described in Example 4. The slightly damp treated pigments were dried in an oven at 110° C. overnight. No further steam micronization of these samples was performed.

Lacing tests of these treated TiO₂ pigments produced a rating of 1.1 for 0.5% isopropyl tri(isostearoyl) titanate (KR TTS) treated pigments and 1.0 for 0.5% neopentyl(diallyl)oxy tri(dioctyl)phosphato titanate (LICA 12) and neopentyl (diallyl)oxy trineodecanoyl titanate (LICA 01) treated pigment. The dispersion evaluation gave 640 cps to 0.5% LICA 01, 10,100 cps to 0.5% LICA 12 and 74,000 cps to 0.5% KR TTS treated TiO₂ samples.

Other Analyses of the Organotitanate Treated TiO₂ Pigments

Example 6

Carbon Content Analysis

The concentration of carbon, or carbon content, is a measure of the actual organic loading in a TiO₂ sample after the organic surface treatment. The instrument used for this test was a LECO SC-444 sulfur/carbon analyzer. As displayed in Table 1, TiO₂ pigment treated with 0.5% organotitanate compounds showed higher carbon contents, relative to their respective chemical loading levels, than the 1.0% silane treated pigment. After steam-micronization, the carbon content was reduced by 10% to 45%, depending on the process conditions.

TABLE 1

The carbon contents of the TiO₂ pigment samples treated with organotitanate and silane compounds.

| Pigment Sample | Treatment Agent | Loading Level (%) | Mixing Method | Carbon Content (%) |
|---|---|---|---|---|
| Comparative Example 1 | Hexyltrichlorosilane | 1.00 | Slurry | 0.34 |
| Example 1 | KR TTS | 0.50 | Slurry | 0.22 |
|  | LICA 01 | 0.50 |  | 0.19 |
| Example 3 | KR TTS | 0.56 | Wet | 0.37 |
|  | LICA 01 | 0.58 | Paste | 0.27 |
| Example 4 | KR TTS | 0.55 | Dry | 0.30 |
|  | LICA 01 | 0.55 | Powder | 0.29 |
| Example 5 | KR TTS | 0.50 | Micronized | 0.20 |
|  | LICA 01 | 0.50 | Dry | 0.30 |
|  | LICA 12 | 0.51 | Powder | 0.30 |

Example 7

Thermal Desorption Analysis

Thermal desorption of TiO₂ treated with organics is the measure of its thermal stability and also an indication of the organic-to-pigment surface bonding strength. A lower thermal desorption temperature may indicate weak organic-to pigment interactions, such as Van der Waals interactions, or, a weak bond, such as certain hydrogen bonds; on the other hand, a higher desorption temperature may indicate a strong interaction or chemical bond, such as a covalent bond. This test was carried out for all the samples described in the previous examples.

All of the samples showed a very small amount of desorption in the relatively low temperature range (less than 150° C.). This is the region in which molecular water and volatile organics will desorb. The small amount of material released in this temperature region would indicate that only a slight amount of moisture was absorbed in these pigment samples after the organic surface treatment, which explains the good lacing resistance rating of 1.0-1.2 for all the samples.

In the intermediate temperature range of 200-550° C., all the samples showed major desorption, of which their temperature ranges are shown in Table 2. The TiO₂ sample treated with LICA 12 in Example 5 displayed major desorption at an intermediate temperature range of 200-320° C., while the other nine TiO₂ samples at the higher temperature range of 300-500° C. Therefore, organotitanate compounds, KR TTS and LICA 01 are covalently bonded to the TiO₂ surfaces, with a bonding strength similar to that of a silane treated TiO₂ pigment. Meanwhile, organotitante compound LICA 12 is hydrogen-bound to TiO₂ surfaces. The neopentyl(diallyl)oxy group in LICA 12 did not dissociate from the titanate compound to facilitate a covalent bonding between the organic titanate and TiO₂ surfaces.

TABLE 2

Thermal Desorption Temperatures of the TiO₂ Samples.

| TiO₂ Sample | Treatment Agent | Thermal Desorption Temperature (° C.) |
|---|---|---|
| Comparative Example 1 | Hexyltrichlorosilane | 350-600 |
| Example 1 | KR TTS | 320-500 |
|  | LICA 01 | 320-520 |
| Example 3 | KR TTS | 300-550 |
|  | LICA 01 | 300-600 |
| Example 4 | KR TTS | 340-500 |
|  | LICA 01 | 300-500 |
| Example 5 | KR TTS | 350-500 |
|  | LICA 01 | 300-500 |
|  | LICA 12 | 200-320 |

The comparison of the thermal desorption profiles of TiO₂ prior to and after micronization of all the samples indicates that there was little change in the organics-to-pigment bonding environment, but a noticeable reduction of the chemical loading, which is consistent with the carbon content analysis.

It will be apparent to those skilled in the art that various modifications and variations can be made to various embodiments described herein without departing from the spirit or scope of the teachings herein. Thus, it is intended that various embodiments cover other modifications and variations of various embodiments within the scope of the present teachings.

What is claimed is:

1. A composition consisting of a plastic selected from the group consisting of polyethylene, polypropylene and polybutylene, having dispersed therein a pigment comprising titanium dioxide particles covalently bound to a neopentyl(diallyl)oxy trineodecanoyl titanate coupling agent, the neopentyl (diallyl)oxy group of the coupling agent being dissociated from the covalently bound coupling agent, wherein the coupling agent thermally desorbs from the titanium dioxide particles over a temperature range of from about 300° C. to about 500° C., and wherein the trineodecanoyl titanate group imparts hydrophobicity to the titanium dioxide particles and improved dispersability of the titanium dioxide particles in the plastic.

2. A composition according to claim 1, wherein the coupling agent is present in an amount from about 0.1 percent to about 5 percent by weight of the titanium dioxide.

3. A composition according to claim 1, wherein the titanium dioxide particles have a particle size in a range of between about 0.1 and about 1 micron.

4. A composition according to claim 1, wherein the titanium dioxide is the crystalline form of anatase or rutile or combinations thereof.

5. A composition according to claim 1, wherein said pigment comprises up to 85% by total weight.

6. A composition according to claim 1, wherein said pigment comprises from 50% to 85% by total weight.

* * * * *